(12) United States Patent
Ishizu et al.

(10) Patent No.: US 10,899,000 B2
(45) Date of Patent: Jan. 26, 2021

(54) ROBOT

(71) Applicant: KABUSHIKI KAISHA YASKAWA DENKI, Kitakyushu (JP)

(72) Inventors: Kensei Ishizu, Kitakyushu (JP); Makoto Tabata, Kitakyushu (JP); Kazunori Yamamoto, Kitakyushu (JP); Tsuyoshi Ito, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 326 days.

(21) Appl. No.: 15/985,709

(22) Filed: May 22, 2018

(65) Prior Publication Data
US 2019/0001483 A1 Jan. 3, 2019

(30) Foreign Application Priority Data
Jun. 29, 2017 (JP) ................. 2017-127746

(51) Int. Cl.
| | | |
|---|---|---|
| H02G 3/04 | (2006.01) |
| H01B 7/00 | (2006.01) |
| B25J 9/00 | (2006.01) |
| B25J 15/00 | (2006.01) |
| B25J 18/00 | (2006.01) |
| H01B 13/08 | (2006.01) |
| B25J 19/06 | (2006.01) |
| B25J 19/00 | (2006.01) |

(Continued)

(52) U.S. Cl.
CPC .......... *B25J 9/0021* (2013.01); *B25J 11/0075* (2013.01); *B25J 15/0066* (2013.01); *B25J 18/007* (2013.01); *B25J 19/0025* (2013.01); *B25J 19/0075* (2013.01); *B25J 19/06* (2013.01); *H01B 7/0009* (2013.01); *H01B 13/0858* (2013.01); *H01B 7/041* (2013.01)

(58) Field of Classification Search
CPC .. B25J 9/0021; B25J 19/0025; B25J 19/0075; B25J 9/06; B25J 11/0075; B25J 15/0066; B25J 18/007; B25J 19/06; B25J 19/00; H01B 7/0009; H01B 13/0858; H01B 7/041; H01B 7/04; H01B 7/00; H01B 9/00; H01B 7/02
USPC ..... 174/480, 481, 50, 53, 57, 58, 68.1, 68.3, 174/95, 97, 96, 99 R, 72 R, 110 R, 120 R; 248/68.1, 49
See application file for complete search history.

(56) References Cited

U.S. PATENT DOCUMENTS 3,833,754 A * 9/1974 Philibert ............... H01R 4/64
174/653
5,777,267 A * 7/1998 Szydel ............... B25J 19/0025
174/72 A (Continued)

FOREIGN PATENT DOCUMENTS

JP 61-168492 7/1986

*Primary Examiner* — Angel R Estrada
(74) *Attorney, Agent, or Firm* — Mori & Ward, LLP

(57) ABSTRACT

A robot includes a robot body and a feeding cable. The robot body is disposed in an explosion-proof region. The feeding cable is disposed in the explosion-proof region, and power is supplied to the robot body through the feeding cable. The feeding cable includes a plurality of wires and a cover. Each of the plurality of wires includes a conductor and an insulator covering the conductor. The cover covers the plurality of wires and has a thickness of equal to or greater than 10 percent of an outer diameter of the feeding cable.

20 Claims, 6 Drawing Sheets

(51) Int. Cl.
*B25J 11/00* (2006.01)
*H01B 7/04* (2006.01)

(56) References Cited

U.S. PATENT DOCUMENTS

| | | | | |
|---|---|---|---|---|
| 5,949,209 | A * | 9/1999 | Okamoto | B25J 19/0079 174/17 GF |
| 7,049,524 | B2 * | 5/2006 | Belli | H01B 3/441 174/120 R |
| 7,247,796 | B2 * | 7/2007 | Hagen | C08L 53/02 174/110 R |
| 7,790,984 | B2 * | 9/2010 | Choi | B25J 19/0025 174/135 |
| 8,431,836 | B2 * | 4/2013 | Miretti | H02G 3/0675 16/2.2 |
| 8,829,350 | B2 * | 9/2014 | Iwasaki | C08K 5/0025 174/110 R |
| 9,040,826 | B2 * | 5/2015 | Oka | H01B 5/10 |
| 10,121,569 | B2 * | 11/2018 | Otsubo | H02G 3/0412 |

* cited by examiner

ROBOT

CROSS-REFERENCE TO RELATED APPLICATIONS

The present application claims priority under 35 U.S.C. § 119 to Japanese Patent Application No. 2017-127746, filed Jun. 29, 2017. The contents of this application are incorporated herein by reference in their entirety.

BACKGROUND

Field of the Invention

The embodiments disclosed herein relate to a robot.

Discussion of the Background

JP 61-168492A discloses an electrically driven robot operable in an environment containing flammable gas or vapor. On a lower base portion of the electrically driven robot, a pressure conduit is mounted for feeding cables to pass through.

SUMMARY

According to one aspect of the present disclosure, a robot includes a robot body and a feeding cable. The robot body is disposed in an explosion-proof region. The feeding cable is disposed in the explosion-proof region, and power is supplied to the robot body through the feeding cable. The feeding cable includes a plurality of wires and a cover. Each of the plurality of wires includes a conductor and an insulator covering the conductor. The cover covers the plurality of wires and has a thickness of equal to or greater than 10 percent of an outer diameter of the feeding cable.

According to another aspect of the present disclosure, a robot includes a robot body, a feeding cable, and a cable ground. The robot body is disposed in an explosion-proof region. The feeding cable is disposed in the explosion-proof region, and power is supplied to the robot body through the feeding cable. The feeding cable includes a plurality of wires and a cover. Each of the plurality of wires includes a conductor and an insulator covering the conductor. The cover covers the plurality of wires. The cable ground is mounted on the robot body, and the feeding cable is passed through the cable ground. The cable ground includes a sealing filled portion that contains the plurality of wires pulled out of the cover and that is filled with a sealing material.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
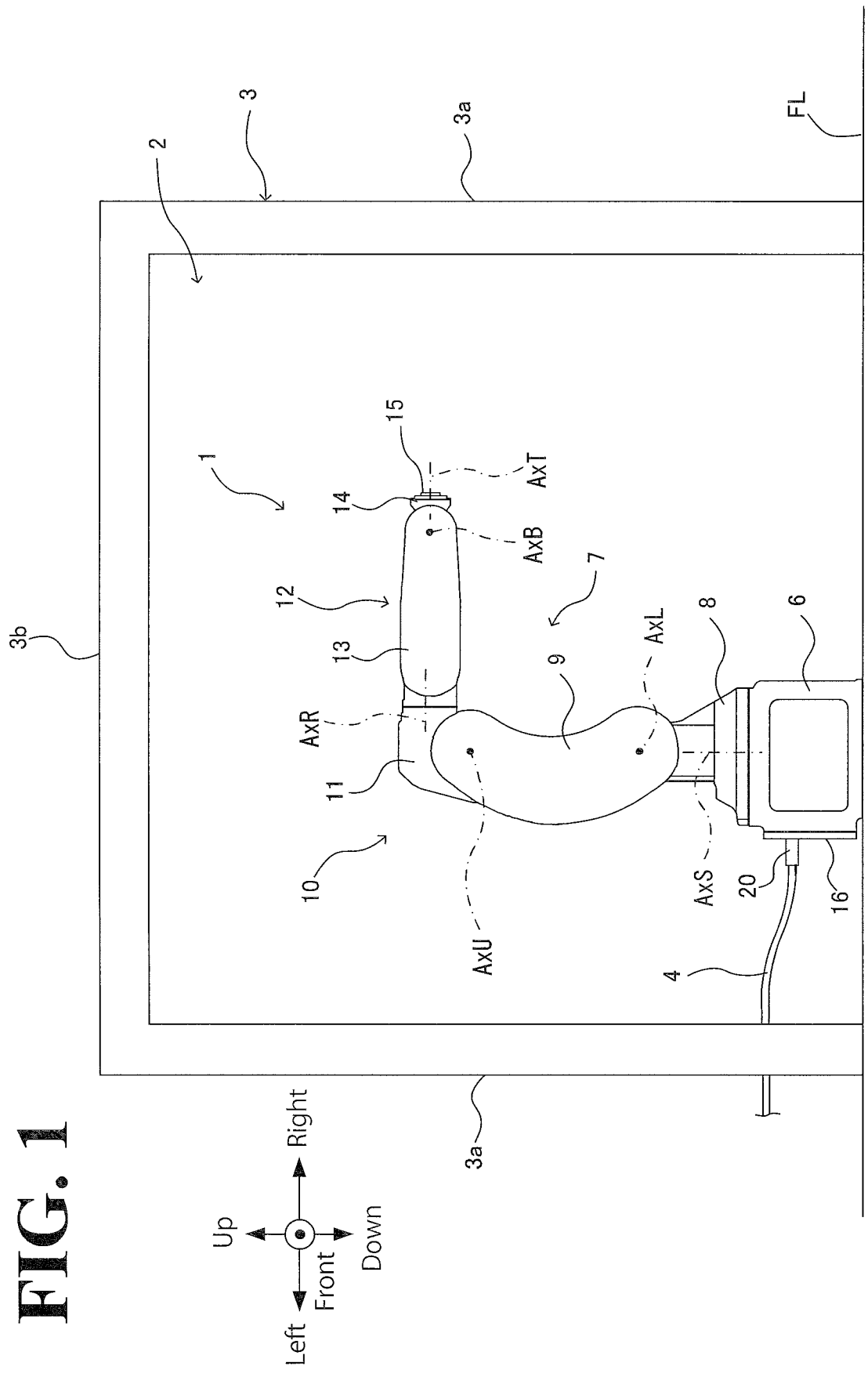
FIG. 1 illustrates a general arrangement of a robot disposed in a coating booth.

The embodiments will now be described with reference to the accompanying drawings, wherein like reference numerals designate corresponding or identical elements throughout the various drawings.

For convenience of description of the robot and other configurations, the following description uses "up", "down", "right", "left", "front", "rear", and other direction indicating terms. These terms of direction, however, are not intended as limiting the relative positions of the robot and other configurations.

1. General Arrangement of Robot

By referring to FIG. 1, a general arrangement of a robot 1 according to this embodiment will be described. The robot 1 is a coating robot used in coating applications.

As illustrated in FIG. 1, the robot 1 includes a robot body 10 and a feeding cable 4. The robot body 10 is disposed in a coating booth 2 (which is a non-limiting example of the explosion-proof region recited in the appended claims). The feeding cable 4 is disposed in the coating booth 2, and power is supplied to the robot body 10 through the feeding cable 4. The coating booth 2 is surrounded by a box-shaped protection barrier 3. The protection barrier 3 is disposed on an installation surface FL, such as a floor, and includes a plurality of side walls 3a and a ceiling wall 3b. The side walls 3a stand on the installation surface FL. The ceiling wall 3b is disposed at the upper ends of the side walls 3a. The inside of the coating booth 2 is maintained at negative pressure by a decompression device, not illustrated.

The robot body 10 includes a base 6 and an arm 7. The arm 7 has six movable portions. In the embodiment illustrated in FIG. 1, the robot body 10 is a six-axis vertical multi-articular robot having a single arm.

The base 6 is fixed to the installation surface FL, It will be understood by those skilled in the art that the base 6 may be disposed on a surface other than the installation surface FL, examples including one side wall 3a and the ceiling wall 3b of the coating booth 2, or the base 6 may be disposed on any other machine, apparatus, or device other than the robot 1.

The arm 7 is connected to and turnable relative to the base 6. As used herein, the base 6 side end of each movable portion of the arm 7 is defined as the "base end" of the movable portion, and the end opposite to the base 6 side end is defined as the "leading end" of the movable portion. The arm 7 includes a turnable head 8, a lower arm 9, an upper arm 11, and a wrist 12. The wrist 12 has three movable portions.

The turnable head 8 is supported by the base 6 and turnable about an S axis AxS, which is a turning axis orthogonal to the installation surface FL. The turnable head 8 is driven by a motor (not illustrated) contained in the base 6 or the turnable head 8 to turn about the S axis AxS relative to the base 6.

The lower arm 9 is supported by the leading end of the turnable head 8 and turnable about an L axis AxL, which is a turning axis orthogonal to the S axis AxS. The lower arm 9 is driven by a motor (not illustrated) disposed in the vicinity of the joint between the lower arm 9 and the turnable head 8 to turn about the L axis AxL relative to the leading end of the turnable head 8.

The upper arm 11 is supported by the leading end of the lower arm 9 and turnable about a U axis AxU, which is a turning axis parallel to the L axis AxL. The upper arm 11 is driven by a motor (not illustrated) disposed in the vicinity of the joint between the upper arm 11 and the lower arm 9 to turn about the U axis AxU relative to the leading end of the lower arm 9.

The wrist 12 is connected to the leading end of the upper arm 11. The wrist 12 includes a first wrist movable portion 13, a second wrist movable portion 14, and a third wrist movable portion 15.

The first wrist movable portion 13 is supported by the leading end of the upper arm 11 and turnable about an R axis AxR, which is a turning axis orthogonal to the U axis AxU. The first wrist movable portion 13 is driven by a motor (not illustrated) disposed in the vicinity of the joint between the first wrist movable portion 13 and the upper arm 11 to turn about the R axis AxR relative to the leading end of the upper arm 11.

The second wrist movable portion 14 is supported by the leading end of the first wrist movable portion 13 and turnable about a B axis AxB, which is a turning axis orthogonal to the R axis AxR. The second wrist movable portion 14 is driven by a motor (not illustrated) disposed in the first wrist movable portion 13 to turn about the B axis AxB relative to the leading end of the first wrist movable portion 13.

The third wrist movable portion 15 is supported by the leading end of the second wrist movable portion 14 and turnable about a T axis AxT, which is a turning axis orthogonal to the B axis AxB. The third wrist movable portion 15 is driven by a motor (not illustrated) disposed in the first wrist movable portion 13 to turn about the T axis AxT relative to the leading end of the second wrist movable portion 14. On the leading end of the third wrist movable portion 15, an end effector (not illustrated) is mounted.

By changing the end effector, the robot 1 can be used in various applications such as coating, handling, and welding. In this embodiment, the end effector mounted on the leading end of the third wrist movable portion 15 is a coating gun, not illustrated, so that the robot 1 is used for coating purposes. The robot 1 may work on any coating target, examples including, but not limited to, bulky objects such as a body of an automobile and small objects such as a housing of a mobile phone.

In the coating booth 2, an organic solvent or another substance contained in a coating material may vaporize to mix with the air in the coating booth 2, resulting in a flammable gas. If an electrical machine such as a robot is installed in this environment, the flammable gas may ignite due to sparks from a motor, a cable, or another element of the electrical machine or due to a high-temperature object in the coating booth 2. This may result in a fire or an explosion. In light of the circumstances, the robot 1 according to this embodiment has an internal pressure explosion-proof structure. Specifically, in the robot 1, elements such as the cables and the motors to drive the joints are contained in the housings of the movable portions, and the pressure in the housings is adjusted at a slightly higher level than the pressure in the surrounding environment. This configuration prevents the flammable gas (explosive atmosphere) in the coating booth 2 from entering the housing of the robot 1.

The base 6 is an approximately rectangular parallelepiped box (i.e. the base 6 includes a case) and has an opening on at least one surface. In this embodiment, the base 6 has an opening on the left surface of the base 6. The opening is openable and closable by a lid 16, which is attachable and detachable using bolts, not illustrated. At one end, the feeding cable 4 is connected to the robot body 10 through a cable ground 20, which is mounted on the lid 16 of the base 6. At the other end, the feeding cable 4 is connected, through a cable ground, to a robot controller or another device that is not illustrated and that is disposed in a non-explosion-proof region outside the coating booth 2. The cable ground, not illustrated, is disposed on the left side wall 3a of the coating booth 2, for example.

It will be understood by those skilled in the art that the above-described configuration of the robot 1 has been presented for exemplary purposes only as the robot 1 may have any other configuration. For example, the rotation axis directions of the movable portions of the arm 7 may be other than the above-described directions. Also, the number of the movable portions of the wrist 12 may be other than three, and the number of the movable portions of the arm 7 may be other than six. Also, the robot 1 will not be limited to a single-arm robot, with a single arm 7, but may be a multi-arm robot, with a plurality of arms 7. Also, the robot 1 will not be limited to a vertical multi-articular robot but may be any other type of robot, such as a horizontal multi-articular robot. Further, some of the cables and motors may be disposed outside the housings of the arm 7 insofar as explosion-proof specifications are satisfied.

2. Cross-Sectional Structure of Feeding Cable

Figure 2:
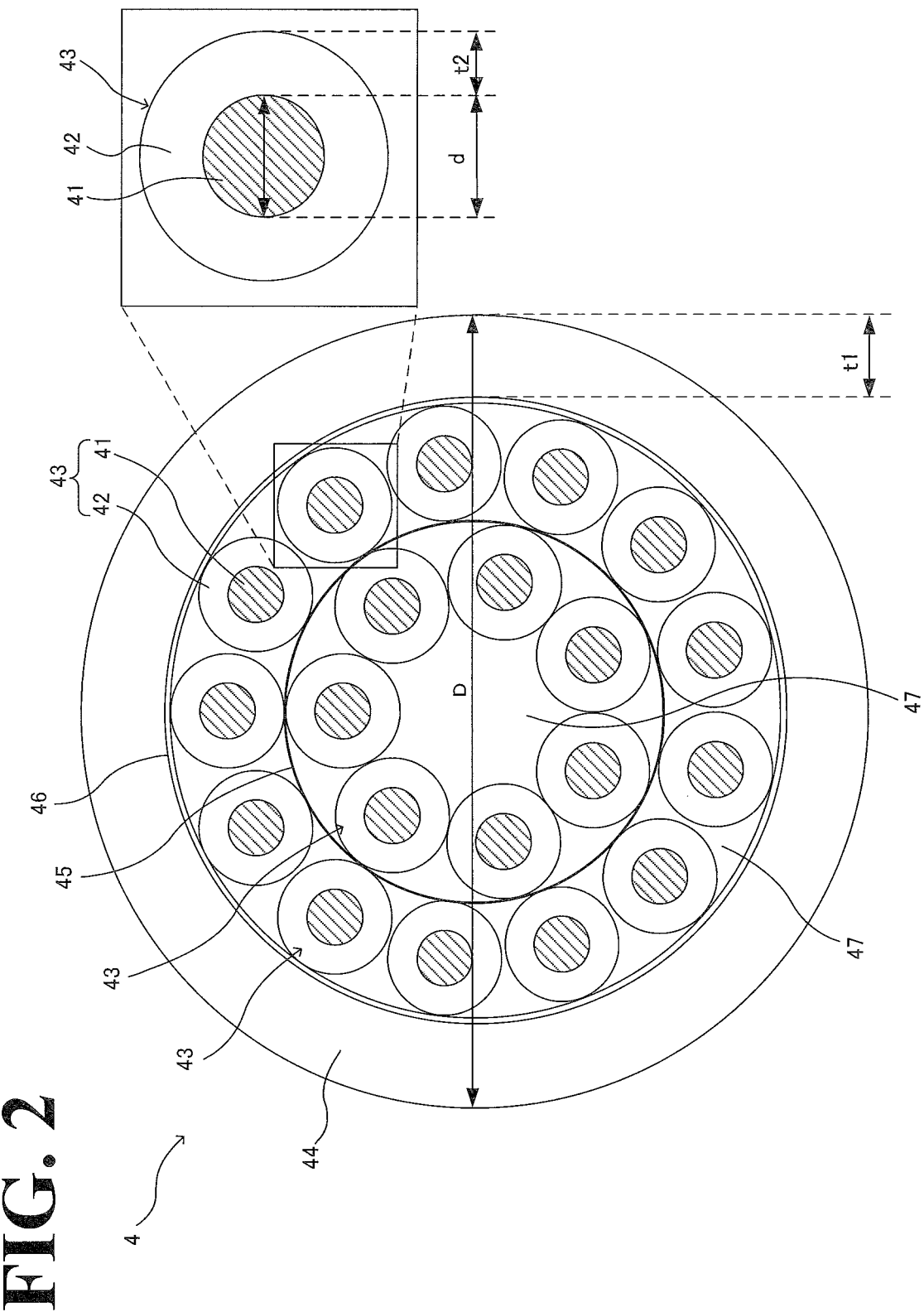
FIG. 2 is a cross-sectional view of a feeding cable.

Next, a cross-sectional structure of the feeding cable 4 will be described by referring to FIG. 2. As illustrated in FIG. 2, the feeding cable 4 includes a plurality of wires 43 and a sheath 44 (which is a non-limiting example of the cover recited in the appended claims). The sheath 44 covers the plurality of wires 43. Each of the wires 43 includes a conductor 41 and an insulator 42. The insulator 42 covers the conductor 41.

The plurality of wires 43 include power lines of the motors (U phase line, V phase line, W phase line, and ground line). There is no particular limitation to the number and arrangement of the wires 43 contained in the sheath 44. In this embodiment, there are a total of 20 wires 43, 7 inner wires 43 and 13 outer wires 43. The plurality of (in this embodiment, seven) inner wires 43 are in contact with each other and arranged in a circumferential direction of the feeding cable 4, forming a ring shape. The plurality of inner wires 43 are covered by an inner holding tape 45 and thus are prevented from becoming loose. The plurality (in this embodiment, 13) of outer wires 43 are approximately in contact with each other and are arranged in the circumferential direction, forming a ring shape, with inner portions of the outer wires 43 in contact with the inner holding tape 45. The plurality of wires 43 are covered by an outer holding tape 46 and thus are prevented from becoming loose.

The sheath 44 is disposed on the outer circumference of the outer holding tape 46 and thus protects the plurality of wires 43. At portions inner than the sheath 44, intervening members 47 are disposed. The intervening members 47 are made of a fibrous plastic material, for example, and serve as spacers between the wires 43. Examples of the positions of the intervening members 47 include, but are not limited to, positions inner than the inner wires 43, positions between two inner wires 43, positions between the inner holding tape 45 and the inner wires 43, positions between two outer wires 43, and positions defined by the outer wires 43, the inner holding tape 45, and the outer holding tape 46.

In order to improve the explosion-proof performance of the feeding cable 4, the sheath 44 has a thickness t1 of equal to or greater than 10 percent of the outer diameter, D, of the feeding cable 4. Also, in order to improve the explosion-proof performance of the feeding cable 4 by improving the insulating property of the wires 43, the insulator 42 has a thickness t2 of equal to or greater than 50 percent of the outer diameter d of the conductor 41.

The thickness t1 of the sheath 44 is preferably equal to or less than 15% of the outer diameter D of the feeding cable 4. A more preferable range of t1/D is 10% to 15%. If t1/D is less than 10%, the explosion-proof performance of the feeding cable 4 may become less reliable. If t1/D is in excess of 15%, the weight of the feeding cable 4 relative to its length increases. Also in excess of 15%, a lack of stiffness (flexibility) of the feeding cable 4 may necessitate a dedicated tool for installation of the feeding cable 4, to the detriment of handleability.

In order to improve the explosion-proof performance of the feeding cable 4, the sheath 44 is made of a non-combustible and oil-resistant polyvinyl chloride material. Also in order to improve the explosion-proof performance of the feeding cable 4, the insulator 42 is made of a heat-resistant polyvinyl chloride material. Also, the conductor 41 is a tinned copper wire.

A rated temperature for the feeding cable 4 is 105 degrees Celsius (° C.), and a rated voltage or an allowable voltage for the feeding cable 4 is from 500 V to 700 V. In this embodiment, the feeding cable 4 has a more preferable rated voltage of 600 V.

It will be understood by those skilled in the art that the structure of the feeding cable 4 described above by referring to its cross-section is not intended in a limiting sense as the feeding cable 4 may have any other cross-sectional structure. For example, while in the above-described embodiment the feeding cable 4 has a two-layer structure made up of an outer layer and an inner layer, the feeding cable 4 may have a one-layer structure or a multi-layer structure made up of three or more layers. For further example, the feeding cable 4 may have a structure without the holding tapes 45 and 46 or the intervening members 47. For further example, the plurality of wires 43 may include a low power-consuming wire and/or a control-related wire connected to an encoder and/or various sensors.

3. Configuration of Cable Ground

Next, a configuration of the cable ground 20 will be described by referring to FIGS. 3 to 5. As described above, the cable ground 20 is mounted on the lid 16 of the base 6 of the robot body 10, and thus fixes the feeding cable 4 to the robot body 10.

Figure 3:
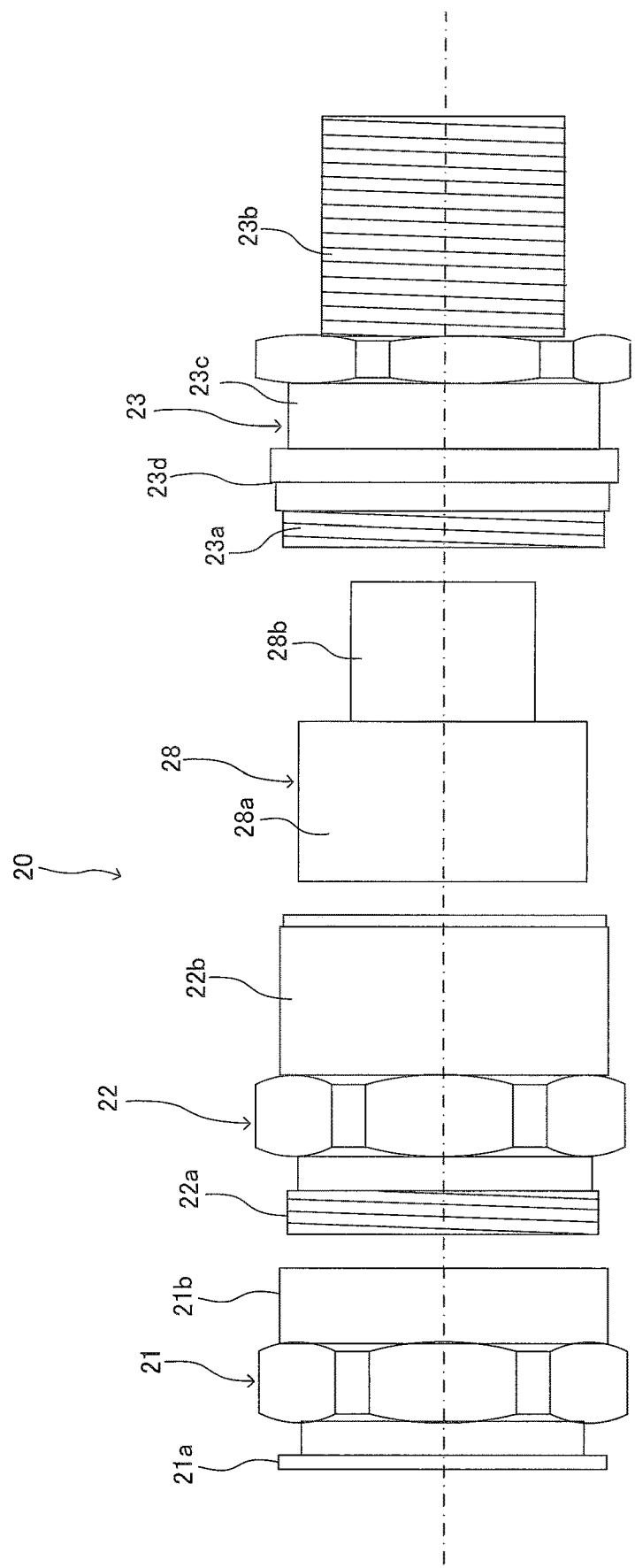
FIG. 3 is an exploded view of a cable ground.
Figure 4:
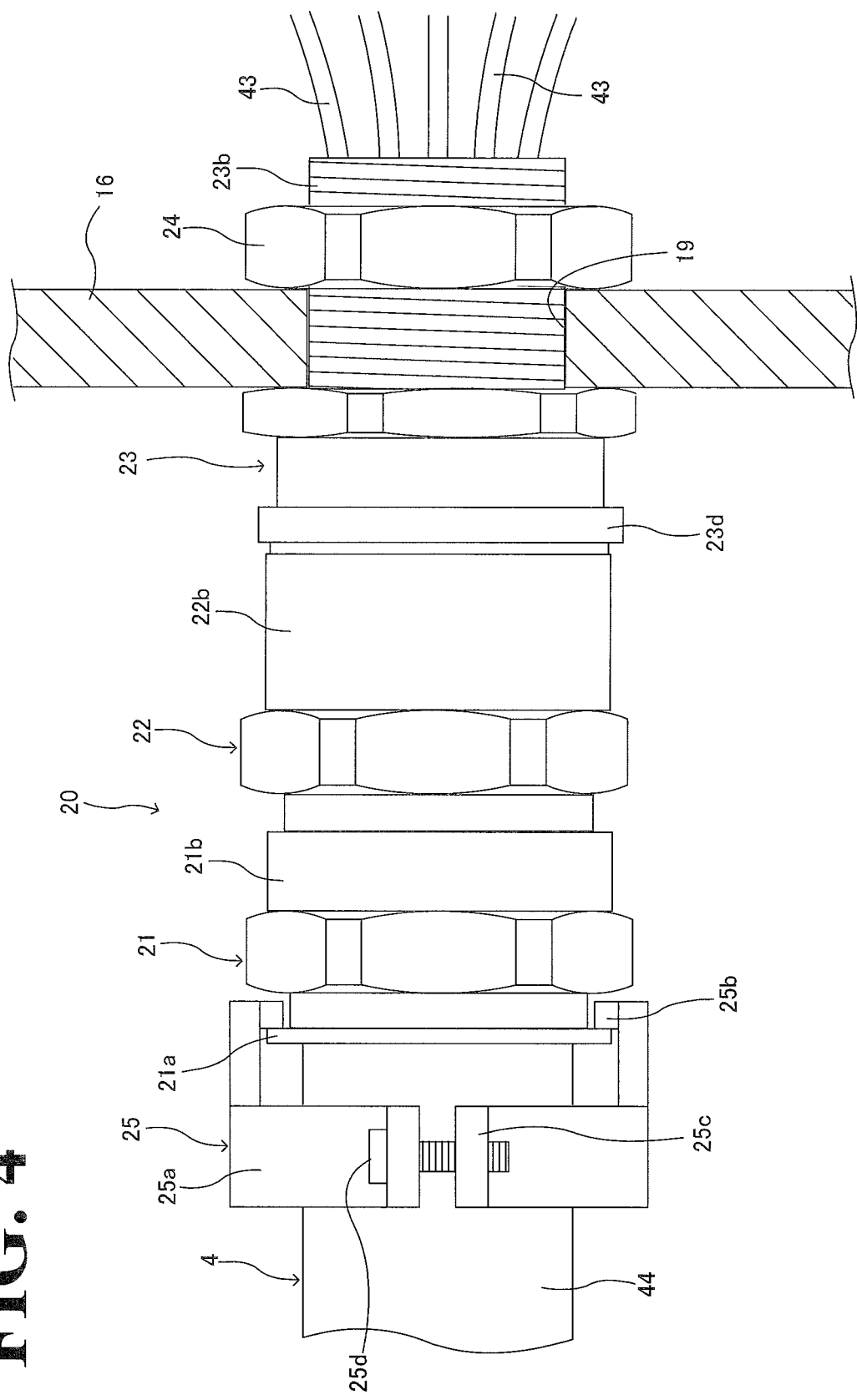
FIG. 4 is an external view of the cable ground with the feeding cable passed through the cable ground.

As illustrated in FIGS. 3 and 4, the cable ground 20 includes a fixing ring 25 (illustrated only in FIG. 4), a flanged nut 21, a bushing 22, a nipple 23, and a sleeve 28. The sleeve 28 is contained in the bushing 22 and the nipple 23.

Figure 5:
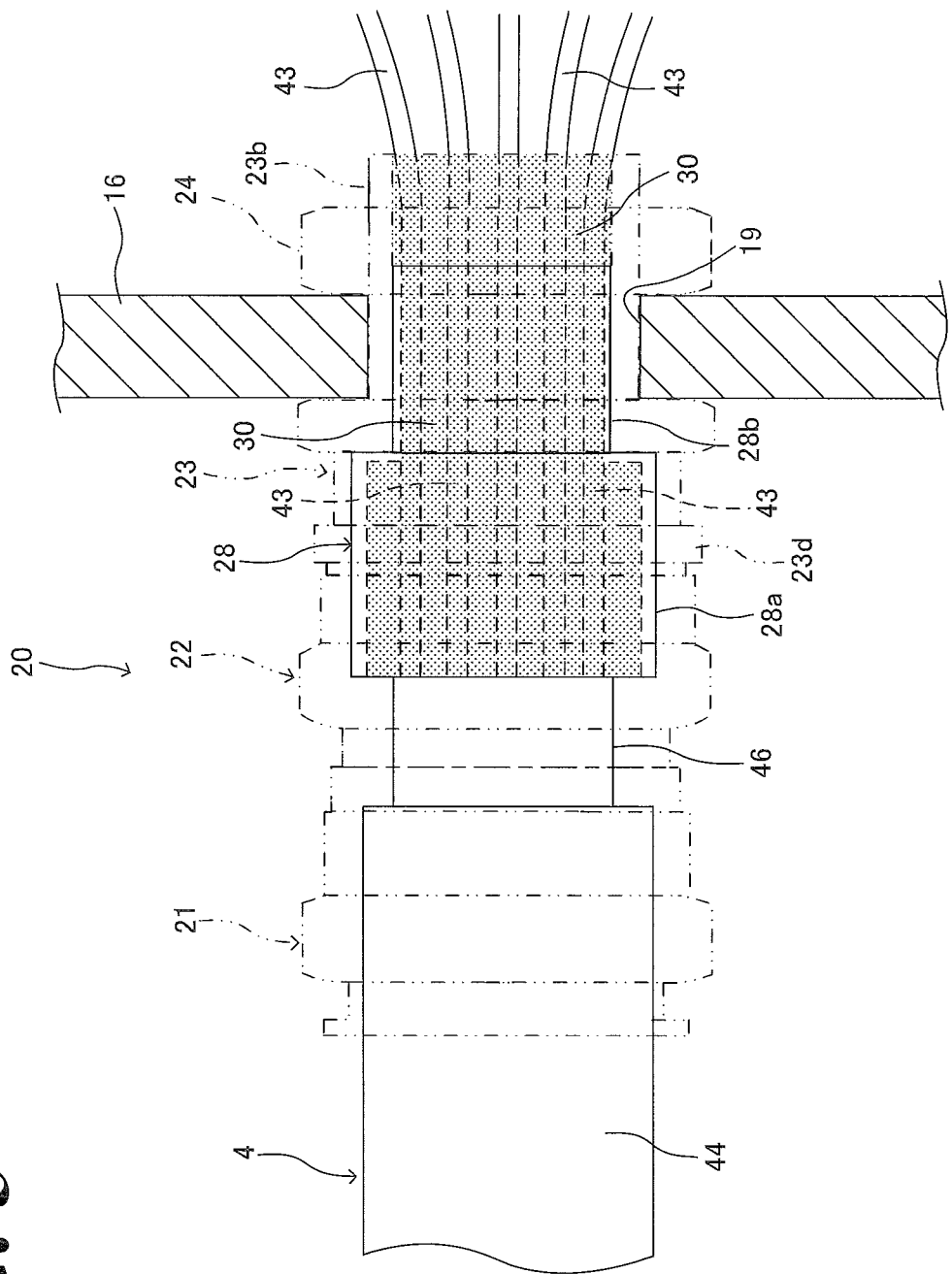
FIG. 5 is a see-through view of the cable ground illustrating its internal structure.

As illustrated in FIGS. 4 and 5, the nut 21 is disposed at one end of the cable ground 20, and the nipple 23 is disposed at the other end of the cable ground 20. The feeding cable 4 is inserted into the cable ground 20 through the nut 21, and the plurality of wires 43 are pulled out of the cable ground 20 through the nipple 23. That is, the inside of the cable ground 20 is an end for some elements of the feeding cable 4, such as the sheath 44, the holding tapes 45 and 46, and the intervening members 47.

As illustrated in FIG. 4, the fixing ring 25 fixes the feeding cable 4. The fixing ring 25 includes a ring body 25a, a plurality of claws 25b, and a pair of locking pieces 25c. The ring body 25a has opening-defining ends at a position on the circumference of the ring body 25a. The claws 25b are disposed on the ring body 25a. The locking pieces 25c are disposed on the opening-defining ends of the ring body 25a.

The ring body 25a is mounted on the outer surface of the sheath 44, and the claws 25b are engaged with the flange, 21a, of the nut 21. The pair of locking pieces 25c have screw holes (not illustrated) through which a bolt 25d is passed. The bolt 25d is used to adjust the inner diameter of the ring body 25a. With this configuration, the fixing ring 25 tightens the sheath 44, thereby fixing the feeding cable 4 to the nut 21.

As illustrated in FIG. 3, the nut 21 includes the flange 21a and a sleeve 21b. The flange 21a is disposed at one end of the nut 21, and the sleeve 21b is disposed at the other end of the nut 21. A female screw, not illustrated, is formed on the inner surface of the sleeve 21b. While in this embodiment the fixing ring 25 is used to tighten the sheath 44, a structure to tighten the sheath 44 may be provided in the sleeve 21b.

The bushing 22 includes a male screw 22a and a sleeve 22b. The male screw 22a is disposed at one end of the bushing 22, and the sleeve 22b is disposed at the other end of the bushing 22, A female screw, not illustrated, is formed on the inner surface of the sleeve 22b. The male screw 22a is turned into the female screw of the nut 21, and thus the bushing 22 is connected to the nut 21. As illustrated in FIG. 5, the inside of the connected nut 21 and bushing 22 is an end for the sheath 44 of the feeding cable 4, with the outer holding tape 46 pulled outward.

As illustrated in FIG. 3, the sleeve 28 includes a larger diameter portion 28a and a smaller diameter portion 28b. The larger diameter portion 28a has a larger diameter and is disposed at one side of the sleeve 28. The smaller diameter portion 28b has a smaller diameter and is disposed at the other side of the sleeve 28.

As illustrated in FIG. 5, the inside of the sleeve 28 is an end for the elements of the feeding cable 4, such as the holding tapes 45 and 46 and the intervening members 47, with the plurality of wires 43 pulled outward.

The sleeve 28 with the larger diameter portion 28a and the smaller diameter portion 28b assembled (which is the state illustrated in FIG. 5) is contained in the inside of the bushing 22 and the nipple 23, In this state, the other end of the larger diameter portion 28a of the sleeve 28 contacts a contact portion, not illustrated, in the nipple 23. This configuration ensures that the sleeve 28 is contained in the inside of the bushing 22 and the nipple 23 while being compressed on both ends of the sleeve 28.

As illustrated in FIG. 3, the nipple 23 includes a larger diameter male screw 23a, a smaller diameter male screw 23b, and a sleeve 23c. The male screw 23a is disposed at one end of the nipple 23. The smaller diameter male screw 23b is disposed at the other end of the nipple 23. The sleeve 23c is disposed at an intermediate portion of the nipple 23. Between the male screw 23a and the sleeve 23c, a stepped O-ring 23d is disposed.

The male screw 23a is turned into the female screw of the bushing 22, and thus the nipple 23 is connected to the bushing 22. Specifically, the opening circumferential edge of the sleeve 22b of the bushing 22 contacts the step of the O-ring 23d of the nipple 23, and thus the connection portion at which the bushing 22 and the nipple 23 are connected to each other is sealed. Thus, the nut 21, the bushing 22, the sleeve 28, the nipple 23, and other elements are assembled into the cable ground 20.

As illustrated in FIGS. 4 and 5, the cable ground 20 is fixed to the lid 16, with the male screw 23b of the nipple 23 passed through a through hole 19 on the lid 16 of the base 6 of the robot body 10 and fastened with a nut 24. Thus, the feeding cable 4 is fixed to the robot body 10 through the cable ground 20. The wires 43 pulled out of the cable ground 20 are connected to a connector, not illustrated, in the robot body 10.

As illustrated in FIG. 5, the cable ground 20 is filled with a sealing material 30. There is no particular limitation to the sealing material insofar as the sealing material is nonflammable. A non-limiting example of the sealing material is a quick-drying and highly adhesive sealing compound. The sealing material 30 is disposed in the inside of the sleeve 28 and the inside of a portion of the male screw 23b of the nipple 23 (this portion of the male screw 23b does not contain the smaller diameter portion 28b of the sleeve 28). These portions filled with the sealing material 30 are where the wires 43 are pulled outward, that is, the sealing material 30 fills the gaps between the plurality of wires 43. Thus, the sleeve 28 and the male screw 23b of the nipple 23 not only contain the plurality of wires 43 pulled out of the sheath 44 but also serve as sealing filled portions filled with the sealing material 30.

It will be understood by those skilled in the art that the above-described configuration of the cable ground 20 has been presented for exemplary purposes only as the cable ground 20 may have any other configuration. For example, the cable ground 20 may not necessarily have the above-described structure in which the outer holding tape 46 is pulled out of the sheath 44; instead, the sheath 44, the holding tapes 45 and 46, the intervening members 47, and other elements of the cable ground 20 may have ends at the same position in the cable ground 20, with the wires 43 pulled directly out of the sheath 44. For further example, the smaller diameter portion 28b of the sleeve 28 may have a length long enough to reach the leading end of the male screw 23b of the nipple 23, with the sealing material 30 filling the sleeve 28 alone. For further example, the through hole 19 of the lid 16 of the base 6 may serve as a screw hole, making the nut 24 unnecessary.

4. Advantageous Effects of the Embodiment

As has been described hereinbefore, the robot 1 according to this embodiment includes the robot body 10 and the feeding cable 4. The robot body 10 is disposed in the coating booth 2. The feeding cable 4 is disposed in the coating booth 2, and power is supplied to the robot body 10 through the feeding cable 4. The feeding cable 4 includes the plurality of wires 43 and the sheath 44. Each of the plurality of wires 43 includes the conductor 41 and the insulator 42, which covers the conductor 41. The sheath 44 covers the plurality of wires 43 and has a thickness t1 of equal to or greater than 10 percent of the outer diameter D of the feeding cable 4.

In this embodiment, the sheath 44 has a thickness t1 of equal to or greater than 10 percent of the outer diameter D of the feeding cable 4. This makes the feeding cable 4 electrically, mechanically, and thermally secure enough not to become a source of ignition, resulting in improved explosion-proof performance. The improved explosion-proof performance eliminates the need for a metal tube in the coating booth 2 for the feeding cable 4 to pass through, resulting in an advantageous reduction in the process step count and cost necessary for connection of the feeding cable 4. Additionally, the above configuration makes the feeding cable 4 flexible enough to make the feeding cable 4 more handleable and to facilitate re-layout of the robot 1 and the feeding cable 4 after they have been installed.

Also in this embodiment, the insulator 42 has a thickness t2 of equal to or greater than 50 percent of the outer diameter d of the conductor 41.

In this embodiment, each of the plurality of wires 43 includes the insulator 42, which has a thickness t2 of equal to or greater than 50 percent of the conductor outer diameter d. This improves the insulation performance of the wires 43 and eliminates or minimizes electrical sparks, abnormally high temperatures, and other sources of ignition. As a result, the explosion-proof performance of the feeding cable 4 further improves.

Also in this embodiment, the sheath 44 is a non-combustible and oil-resistant polyvinyl chloride material.

Increasing the non-combustible and oil-resistant properties of the sheath 44 in this manner minimizes the influence that combustions and external oily substances (such as oil and various organic solvents) have on the sheath 44. As a result, the explosion-proof performance of the feeding cable 4 further improves.

Also in this embodiment, the insulator 42 is a heat-resistant polyvinyl chloride material.

Increasing the heat-resistant property of the insulator 42 of each wire 43 in this manner prevents the insulator 42 from being dissolved and burnt due to generation of heat. This eliminates or minimizes electrical sparks, abnormally high temperatures, and other sources of ignition. As a result, the explosion-proof performance of the feeding cable 4 further improves.

Also in this embodiment, a rated temperature for the feeding cable 4 is 105° C.

Thus, the feeding cable 4 is used at a temperature of 105° C. or lower. This prevents the insulation performance of the feeding cable 4 from degrading, resulting in improved reliability of the feeding cable 4.

Also in this embodiment, a rated voltage for the feeding cable 4 is preferably in the range of 500 V to 700 V. More preferably, a rated voltage for the feeding cable 4 is 600 V.

Thus, the feeding cable 4 has a rated voltage of 500 V to 700 V. This prevents the insulation performance of the feeding cable 4 from degrading due to generation of heat, resulting in improved reliability of the feeding cable 4.

Also in this embodiment, the conductor 41 is a tinned copper wire.

As in this embodiment, tinning a copper wire eliminates or minimizes oxidation of the surface of the copper wire. This prevents conductivity of the copper wire from degrading, resulting in improved reliability of the feeding cable 4.

Also in this embodiment, the robot 1 includes the cable ground 20. The cable ground 20 is mounted on the robot body 10, and has a first end through which the feeding cable 4 is inserted and a second end through which the plurality of wires 43 are pulled out.

In this embodiment, the feeding cable 4 is fixed to the robot body 10 using the cable ground 20. This prevents the feeding cable 4 from being removed by pulling force or vibration. This also prevents the wires 43 from being removed from the connector in the robot body 10. As a result, the reliability of the robot 1 improves.

Also in this embodiment, the cable ground 20 includes the sleeve 28 and the nipple 23 (the male screw 23b). The sleeve 28 and the nipple 23 contain the plurality of wires 43 pulled out of the sheath 44 and are filled with the sealing material 30.

In this embodiment, the wires 43 of the feeding cable 4 are inserted from the outside of the robot body 10 into the inside of the robot body 10 through the cable ground 20. In this respect, the inside of the cable ground 20 (the sleeve 28 and the male screw 23b of the nipple 23) is sealed by the sealing material 30. This prevents the explosive atmosphere in the coating booth 2 from entering the robot body 10. This, in turn, improves the explosion-proof performance of the robot 1, enabling the robot 1 to comply with any explosion-proof standards.

5. Modifications

Modifications of the above-described embodiment will be described below.

Figure 6:
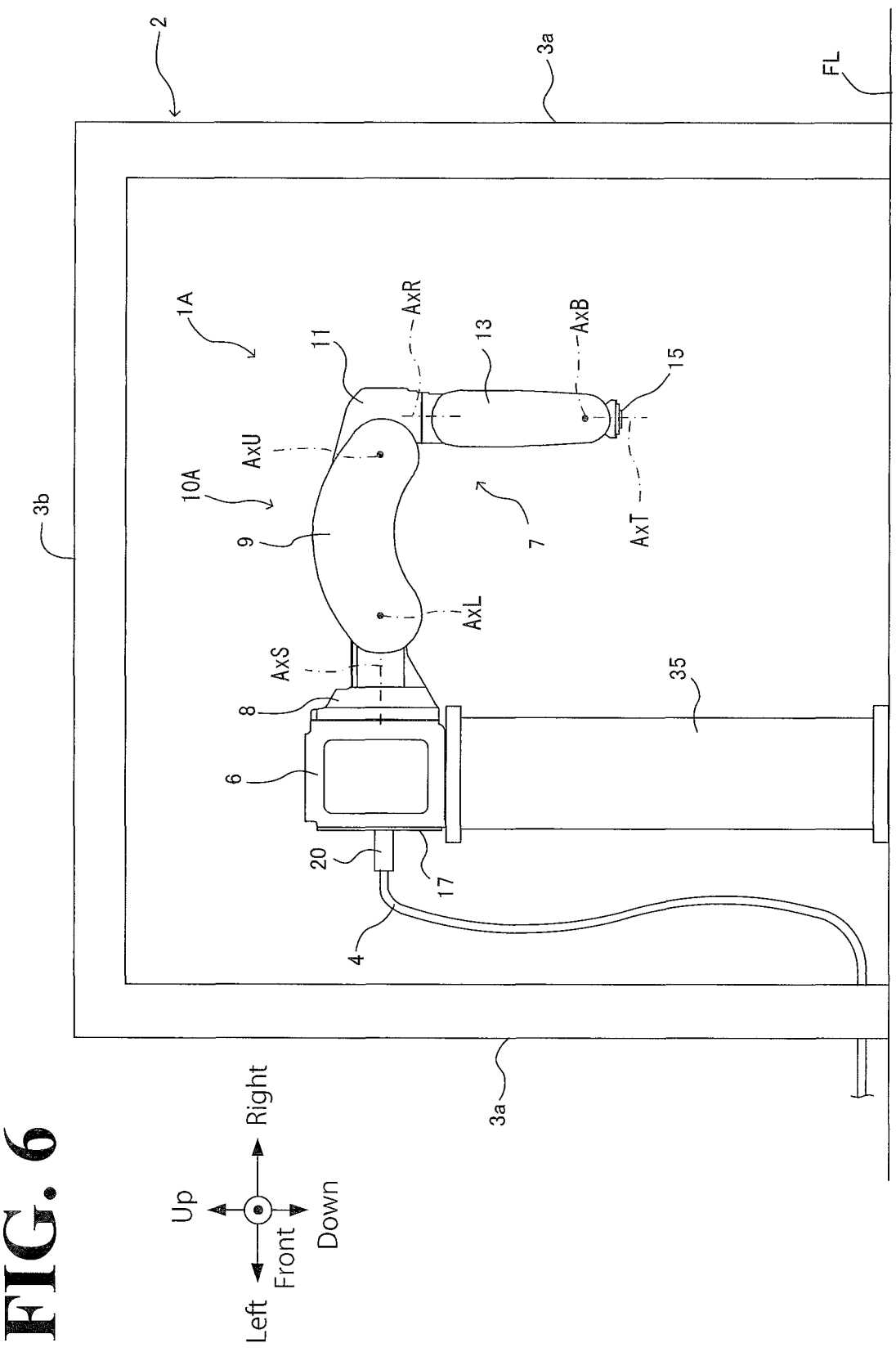
FIG. 6 illustrates a general arrangement of a robot according to a modification in which a robot body is disposed at a height.

While in the above-described embodiment the robot body 10 is disposed on the installation surface FL of the coating booth 2, the robot body 10 may be disposed at a height from the installation surface FL. This modification is illustrated in FIG. 6. Like reference numerals designate corresponding or identical elements throughout FIGS. 1 and 6, and these will not be elaborated upon here.

As illustrated in FIG. 6, a robot 1A according to this modification includes a robot body 10A. The robot body 10A is equivalent to the robot body 10 (illustrated in FIG. 1) overturned. The base 6 of the robot body 10A is fixed to the upper surface of a column 35, which is disposed on the installation surface FL of the coating booth 2. The base 6 has an opening on the left surface of the base 6. The opening is openable and closable by a lid 17, which is attachable and detachable using bolts, not illustrated. The feeding cable 4 is connected to the robot body 10A through the cable ground 20, which is mounted on the lid 17. The robot 1A is otherwise similar in configuration to the robot 1 and will not be further elaborated upon here.

When a robot is disposed at a height as in this modification, it is particularly difficult to contain the feeding cable 4 in a metal tube. This can be effectively addressed by employing the above-described embodiment, which eliminates the need for a metal tube and imparts flexibility to the feeding cable 4. This, as a result, advantageously reduces the process step count and cost necessary for connection of the feeding cable 4.

When the terms "perpendicular (orthogonal)", "parallel", and "plane" are used in this specification, these terms may not necessarily mean "perpendicular (orthogonal)", "parallel", and "plane", respectively, in a strict sense. Specifically, the terms "perpendicular (orthogonal)", "parallel", and "plane" mean "approximately perpendicular (orthogonal)", "approximately parallel", and "approximately plane", respectively, with design-related and production-related tolerance and error taken into consideration.

Also, when the terms "identical", "same", "equivalent", and "different" are used in the context of dimensions, magnitudes, sizes, or positions, these terms may not necessarily mean "identical", "same", "equivalent", and "different", respectively, in a strict sense. Specifically, the terms "identical", "same", "equivalent", and "different" mean "approximately identical", "approximately same", "approximately equivalent", and "approximately different", respectively, with design-related and production-related tolerance and error taken into consideration.

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the Untied States is:

1. A robot comprising:
   a robot body disposed in an explosion-proof region; and
   a feeding cable which is disposed in the explosion-proof region and through which power is supplied to the robot body, the feeding cable comprising:
      a plurality of wires each comprising a conductor and an insulator covering the conductor; and
      a cover covering the plurality of wires and having a thickness of equal to or greater than 10 percent of an outer diameter of the feeding cable and less than or equal to 15 percent of the outer diameter of the feeding cable.

2. The robot according to claim 1, wherein the insulator has a thickness of equal to or greater than 50 percent of an outer diameter of the conductor.

3. The robot according to claim 1, wherein the cover comprises a non-combustible and oil-resistant polyvinyl chloride material.

4. The robot according to claim 1, wherein the insulator comprises a heat-resistant polyvinyl chloride material.

5. The robot according to claim 1, wherein a rated temperature for the feeding cable is 105 degrees Celsius.

6. The robot according to claim 1, wherein a rated voltage for the feeding cable is from 500 V to 700 V.

7. The robot according to claim 1, wherein the conductor comprises a tinned copper wire.

8. The robot according to claim 2, wherein the cover comprises a non-combustible and oil-resistant polyvinyl chloride material.

9. The robot according to claim 2, wherein the insulator comprises a heat-resistant polyvinyl chloride material.

10. The robot according to claim 3, wherein the insulator comprises a heat-resistant polyvinyl chloride material.

11. The robot according to claim 8, wherein the insulator comprises a heat-resistant polyvinyl chloride material.

12. The robot according to claim 2, wherein a rated temperature for the feeding cable is 105 degrees Celsius.

13. The robot according to claim 3, wherein a rated temperature for the feeding cable is 105 degrees Celsius.

14. The robot according to claim 4, wherein a rated temperature for the feeding cable is 105 degrees Celsius.

15. The robot according to claim 8, wherein a rated temperature for the feeding cable is 105 degrees Celsius.

16. The robot according to claim 9, wherein a rated temperature for the feeding cable is 105 degrees Celsius.

17. The robot according to claim 10, wherein a rated temperature for the feeding cable is 105 degrees Celsius.

18. A robot comprising:
    a robot body disposed in an explosion-proof region and having a case to prevent an inside of the robot body from being exposed to the explosion-proof region;
    a feeding cable which is disposed in the explosion-proof region and through which power is supplied to the robot body, the feeding cable comprising:
       a plurality of wires each comprising a conductor and an insulator covering the conductor; and
       a cover covering the plurality of wires;
    a cable ground mounted on the case, the cable ground comprising:
       a first end through which the feeding cable is inserted;

a second end through which the plurality of wires are pulled out; and a fixing ring provided in the explosion-proof region to fasten the feeding cable onto the case.

19. The robot according to claim 18, wherein the cable ground comprises a sealing filled portion that contains the plurality of wires pulled out of the cover and that is filled with a sealing material.

20. A robot comprising:

a robot body disposed in an explosion-proof region and having a case to prevent an inside of the robot body from being exposed to the explosion-proof region;

a feeding cable which is disposed in the explosion-proof region and through which power is supplied to the robot body, the feeding cable comprising:

a plurality of wires each comprising a conductor and an insulator covering the conductor; and a cover covering the plurality of wires;

a cable ground which is mounted on the case and through which the feeding cable is passed, the cable ground comprising:

a sealing filled portion that contains the plurality of wires pulled out of the cover and that is filled with a sealing material; and a fixing ring provided in the explosion-proof region to fasten the feeding cable onto the case.

* * * * *